United States Patent Office 3,427,380
Patented Feb. 11, 1969

---

3,427,380
ORAL COMPOSITIONS FOR RETARDING DENTAL PLAQUE FORMATION COMPRISING PARA-AMINOBENZOIC ACID
Jerry J. Kirkland, Forest Park, Ohio, assignor to The Procter & Gamble Company, Cincinnati, Ohio, a corporation of Ohio
No Drawing. Filed Nov. 23, 1966, Ser. No. 596,394
U.S. Cl. 424—54  5 Claims
Int. Cl. A61k 7/16

---

ABSTRACT OF THE DISCLOSURE

Oral compositions such as dentifrice, mouthwash, and chewing gum containing para-aminobenzoic acid to inhibit capsule formation by oral microorganisms thereby retarding dental plague development.

---

This invention relates to improved oral compositions for dental hygiene. More particularly, it relates to oral compositions which retard the development of plaque on dental surfaces.

By the term "oral composition" as used herein is meant a product which in the ordinary course of usage is retained in the oral cavity for a time sufficient to contact substantially all of the dental surfaces. Such products include, for example, dentifrices, mouthwashes, chewing gums, lozenges and dental prophylaxis pastes and topical solutions for application in the dental office.

Plaque is a soft deposit which accumulates on the tooth surfaces, especially the labial and buccal surfaces. It consists of an organized structure of microorganisms, proteinaceous and carbohydrate substances, epithelial cells and food debris. Although it is relatively soft and can be removed from the teeth given sufficient abrasive action, under normal circumstances it quickly reforms on the tooth surface after its removal.

It has been hypothesized that the presence of dental plaque is a contributory factor in the development of various pathological conditions of the teeth and soft tissue of the oral cavity. For example, plaque may well be a precursor of calculus and promote caries formation. Further, marginal erythema of the gingiva is a common finding associated with plaque. Apparently, the saccharolytic organisms of the oral cavity cause decalcification beneath the plaque matrix through the accumulation of organic acids. The findings of various researchers suggest the possibility that toxic products of plaque may be absorbed through the gingival epithelium in humans and result in localized inflammation. In addition to the pathologic potential of plaque, this material can become unsightly and aesthetically displeasing.

As to the etiology of plaque, it is known that certain of the aerobic microorganisms which are normally present in the oral cavity play a role in the initial stages of plaque formation. These organisms produce a capsular material which apparently causes the cells of the organisms to adhere to each other, holding the plaque together and allowing its further growth. For example, one of the capsule-forming organisms which occurs in large numbers in early plaque is *Neisseria sicca*.

Various dentifrice and mouthwash preparations have been disclosed in the art which purportedly retard plaque formation. These preparations are generally based on antibacterial substances which are intended to inhibit the growth or kill microorganisms of the oral cavity. However, antibacterial substances which are suitable for products intended for self application without medical supervision are not sufficiently effective or broad spectrum in their activity to eliminate all microorganisms. As is well known, interference with the natural balance of the indigenous microbial population can result in a proliferation of surviving organisms to levels that produce pathologic responses.

Ideally, the antimicrobial approach to plaque inhibition will entail altering cell metabolism to reduce the capacity of the involved organisms to participate in plaque formation, without killing the organisms or interfering with their growth.

It is, therefore, an object of this invention to provide improved oral compositions for dental hygiene.

It is a further object of this invention to provide oral compositions which retard the formation of dental plaque.

It is a still further object of this invention to provide oral compositions containing an agent which can retard the development of dental plaque without destroying or inhibiting the growth of the organisms of the oral cavity.

It is yet another object of this invention to provide a method of treating capsule-forming organisms to inhibit capsule formation, without destroying or inhibiting the growth of such organisms.

It has now been found that these and other objects can be attained with oral compositions as hereinbefore defined containing as the essential component para-aminobenzoic acid. Thus, in general terms, the oral compositions of this invention comprise an amount of para-aminobenzoic acid sufficient to inhibit capsule formation by oral microorganisms without inhibiting the growth of said microorganisms, and a carrier suitable for use in the oral cavity.

Para-aminobenzoic acid (PAB) is a commercially available compound which is widely distributed in nature as the B complex factor, both in the free and ester form. It is to be noted, however, that the esters of para-aminobenzoic acid are not useful in the present invention.

PAB is prepared industrially by the reduction of p-nitrobenzoic acid. It is soluble in water, alcohol, ether, ethyl acetate, and glacial acetic acid.

The compositions of this invention, as hereinbefore stated, generally contain from about 0.1% to about 2% by weight of PAB. The limits on the concentration of this component in particular types of oral compositions depend largely on conventional usage conditions of such compositions. For example, a mouthwash composition is often diluted two-fold with water prior to usage and dentifrice compositions are typically diluted three-fold by saliva in usage.

Thus, the concentration of PAB which is actually contacted to the dental surfaces when such products are used can vary with the type of oral composition. It is, of course, the in-use concentration of PAB which is important for the purpose of this invention. Specifically, the concentration of PAB in contact with oral organisms during the course of product usage should range from about .005% to about .01% by weight. If the concentration of PAB in the oral composition is less than about 0.1% by weight in normal usage, the resulting concentration of PAB in contact with the dental surfaces can be less than about .005% by weight such that capsule formation by certain significant capsule-forming organisms in the oral cavity will not be retarded. Concentrations of PAB in the oral composition greater than about 2.0% by weight can in normal usage provide concentrations of PAB in the oral cavity in excess of .01% by weight and the growth of oral microorganisms will be undesirably inhibited.

The utility of PAB for the purpose of this invention was established by the following tests of capsule formation and cell growth.

A basal medium was prepared consisting of 0.42% $K_2HPO_4$; 0.32% $KH_2PO_4$; 0.2% $KNO_3$; 2.0% sucrose; and 0.1% yeast extract (Difco). This medium was adjusted to pH 7.0, sterilized by autoclaving and cooled.

0.2 ml. of a sterile mineral salt solution comprised of 0.5 g. FeSO$_4$; 0.5 g. MnCl$_2$; 5.0 g. MgSO$_4$; 5.0 g. NaCl; and 100 ml. of distilled water was added to the cooled medium. Varying concentrations of PAB were then added to the medium aliquots. These samples employed concentrations of PAB in contact with the test organisms approximating the in-use exposure involved with the compositions of the invention.

The determination of the amount of capsular material produced by Neisseria sicca was conducted as follows:

The basal medium containing PAB was inoculated with Neisseria sicca and incubated at 37° C. At various time intervals, up to 48 hours, a 5 ml. sample of this incubation mixture was heated in a boiling water bath for 15 minutes to solubilize capsular material attached to the cells. The cells were separated from capsule by centrifugation for 15 minutes at 5,000 r.p.m., the supernatant was removed and the packed cells were retained for quantitation of cell growth.

The supernatant solution was precipitated with 3 volumes of 95% ethanol, and allowed to stand at room temtemperature for 15 minutes. The solution was centrifuged and the precipitate was washed by dissolving it in 5 ml. of distilled water and again precipitating with ethanol.

The washed precipitate was dissolved in distilled water and the anthrone test [Trevelyan, W. E. and Harrison, J. S., Biochem. J. 50: 298–303 (1951)] for total carbohydrate was used to quantitate the material, using glucose as the standard.

In the course of cellular growth and resulting capsule synthesis, the medium becomes very opaque and viscous. Thus, the standard methods of quantitating cell growth, e.g. measuring optical density, are unsuitable. Therefore, cell growth was estimated by determining the amount of protein obtained upon centrifugation of the original sample as described supra. Protein concentration was determined by the method of Lowery et al., J. Biol. Chem. 193: 265–275 (1951), using crystallized egg albumen as the standard.

Table 1 below sets forth the values obtained using various concentrations of PAB in the basal medium.

TABLE 1

| PAB Concentration, Percent By Weight | Percent Inhibition [1] of Capsule Synthesis | Cell Growth |
| --- | --- | --- |
| 0.001 | [2] 37 | Normal. |
| 0.0025 | [2] 59 | Do. |
| 0.005 | [2] 69 | Do. |
| 0.01 | [2] 94 | Do. |
| 0.1 | [2] 98 | [3] |

[1] $\frac{\mu g CHO/\mu g \text{ Protein (test media)}}{\mu g CHO/\mu g \text{ Protein (control media)}} \times 100$.
[2] Average of replicate runs.
[3] Delayed growth approx. 24 hrs.

As can be seen from the above table, PAB in concentrations as low as 0.001% and up to about 0.01% by weight substantially inhibits capsule formation without affecting cell growth. This inhibition of capsule formation of Neisserio sicca impairs the role that this organism plays in plaque formation thereby reducing the amount of plaque. Moreover, this is accomplished without interfering with the natural microbial population of the mouth.

In addition to the essential PAB component, the compositions of this invention can contain any of the usual constituents of dentifrices, mouthwash, chewing gum and like formulations.

Dentifrices, especially toothpaste, are preferred oral compositions for the purpose of this invention. Dentifrice compositions typically contain an abrasive polishing material, sudsing agents, flavoring and sweetening agents. Toothpastes usually additionally contain humectants and binders.

Any abrasive polishing material which does not excessively abrade dentin and is compatible with PAB can be used in the present compositions. These include, for example, calcium carbonate, dicalcium orthophosphate dihydrate, calcium pyrophosphate, calcium polymetaphosphate, insoluble sodium polymetaphosphate and resinous abrasive materials such as particulate condensation products of urea and formaldehyde and others disclosed by Cooley et al. in U.S. Patent 3,070,510, granted Dec. 25, 1962.

The total amount of abrasive materials in the dentifrice embodiments of this invention can range from 0.5% to 95% by weight of the dentifrice. Preferably, toothpastes contain from 20% to 60% by weight, and toothpowders contain from 6% to 95% by weight.

Suitable sudsing agents for use herein are those which yield substantial levels of foam and which are otherwise acceptable for use in the oral cavity and compatible with PAB. Examples of suitable sudsing agents include the water-soluble salts of alkyl sulfate having from 10 to 18 carbon atoms in the alkyl radical, e.g., sodium lauryl sulfate; water-soluble salts of sulfonated monoglycerides of fatty acids having from 10 to 18 carbon atoms, e.g., sodium coconut monoglyceride sulfonate; water-soluble salts of fatty acid amines of taurine, e.g., sodium N-methyl-N-palmitoyl tauride; water-soluble salts of fatty acid esters of isethionic acid, e.g., the coconut acid ester of sodium isethionate; and substantially saturated aliphatic acyl amides of saturated aliphatic monoaminocarboxylic acid having 2 to 6 carbon atoms and in which the acyl radical contains 12 to 16 carbon atoms, e.g., sodium N-lauroyl sarcosinate. Mixtures of two or more sudsing agents can also be used.

The sudsing agent can be employed at levels ranging from about 0.5% to 5.0% by weight.

Suitable flavoring agents for use herein include, for example, oil of wintergreen, oil of peppermint, oil of sassafras, and oil of anise. Sweetening agents include, for example, saccharin, dextrose, levulose, and sodium cyclamate.

In the case of certain compositions of this invention, such as toothpaste, it is desirable to employ thickening agents such as hydroxyethylcellulose and water-soluble salts of cellulose ethers, including sodium carboxylmethyl cellulose and sodium carboxymethylhydroxyethyl cellulose; or natural gums, including gum karaya, gum arabic and gum tragacanth. In the case of toothpastes, colloidal magnesium aluminum silicate or finely divided silica can be used as part of the thickening agent to improve the texture of the product. Thickening agents in an amount of from 0.1% to 5.0% can be used.

It is also desirable to inulude some humectant or viscosity modifying material in certain of the oral compositions of this invention. Suitable materials for these purposes include glycerine, sorbitol, and other edible polyhydric alcohols or mixtures thereof. These materials can comprise up to 40% by weight of such compositions.

Several representative oral compositions embodying this invention are set forth in the following examples.

EXAMPLE I

| | Percent by weight |
| --- | --- |
| Para-aminobenzoic acid | 1.8 |
| Dicalcium orthophosphate dihydrate | 44.00 |
| Sorbitol (30% aqueous soln.) | 6.25 |
| Glycerine | 18.00 |
| Hydroxyethylcellulose | 2.00 |
| Sodium lauryl sulfate | 0.37 |
| Sodium coconut monoglyceride sulfonate | 0.75 |
| Magnesium aluminum silicate | 0.40 |
| Flavoring | 0.85 |
| Saccharin | 0.12 |
| Coloring | 0.47 |
| Water | Balance | pH, 4.6.

This composition possesses good consumer properties and when brushed upon the teeth in the conventional manner, it removes accumulated plaque and further serves to retard the redevelopment of plaque for several hours. The microbial population of the oral cavity after use of this product is not significantly altered.

EXAMPLE II

A toothpowder which constitutes another embodiment of this invention has the following composition:

| | Percent by weight |
|---|---|
| Para-aminobenzoic acid | 1.5 |
| Calcium pyrophosphate | 96.00 |
| Sodium lauryl sulfate | 1.00 |
| Flavoring | 1.22 |
| Saccharin | .28 |

When moistened with water and brushed upon the teeth in the conventional manner, the capsule synthesizing capacity of the oral flora is substantially diminished and the formation of plaque is thereby retarded for several hours. Moreover, the use of this compositon does not affect the growth of the oral flow to any significant degree.

EXAMPLE III

A mouthwash embodiment of this invention is formulated as follows:

| | Percent by weight |
|---|---|
| Para-aminobenzoic acid | 1.0 |
| Ethyl alcohol (50%) | 81.00 |
| Glycerine | 12.00 |
| Saccharin | .30 |
| Flavoring | 1.5 |
| Surfactant | 1.0 |
| Water | Balance |

When diluted with water (1 part mouthwash to about 2 parts water) and used in the conventional manner this composition provides an effective means for reducing the formation of dental plaque.

EXAMPLE IV

A chewing gum in accordance with this invention is prepared by conventional means having the following composition:

| | Percent by weight |
|---|---|
| Para-aminobenzoic acid | .25 |
| Gum base [1] | 21.30 |
| Sugar | 59.50 |
| Corn syrup (Baumé 45) | 18.20 |
| Flavoring | .75 |

[1] Ester gum, 30 parts; coumarone resin, 45 parts; latex (dry), 15 parts; paraffin wax (M.P. 180° F.), 10 parts.

This composition provides an effective oral hygienic means. Chewing in the usual manner yields substantial antiplaque effects without otherwise altering the oral flora.

EXAMPLE V

A prophylaxis paste for use in the dental office for removal of plaque and stains, etc. after mechanical removal of calculus, is formulated as follows:

| | Percent by weight |
|---|---|
| Para-aminobenzoic acid | 2.0 |
| Navajo pumice | 75.70 |
| Titanium dioxide | 4.00 |
| Glycerine | 17.75 |
| Hydroxyethylcellulose | 0.23 |
| Saccharin | 0.32 |

Immediately prior to use, water is added to the above composition in an amount required to provide a desired texture. The paste is then applied to the dental surfaces with a rubber prophylactic cup used in the conventional manner. As a result of the PAB content, the re-development of plaque is substantially retarded.

As will be obvious to those skilled in the art a variety of other compositions such as lozenges and the like which would be retained in the oral cavity for substantial periods prior to ingestion can be formulated with para-aminobenzoic acid to attain the benefits of this invention.

What is claimed is:

1. A dentifrice composition for retarding dental plaque formation comprising (1) para-aminobenzoic acid in an amount sufficient to inhibit capsule formation by oral microorganisms without inhibiting the growth of said microorganisms; and (2) from about 0.5% to about 95% by weight of an abrasive material.

2. A toothpaste composition for retarding dental plaque formation comprising (1) para-aminobenzoic acid in an amount sufficient to inhibit capsule formation by oral microorganisms without inhibiting the growth of said microorganisms; (2) from about 20% to about 60% by weight of an abrasive polishing material; (3) from about 0.5% to about 5.0% by weight of a sudsing agent; (4) from about 0.1% to about 5.0% by weight of a thickening agent; and (5) the balance substantially water and humectants.

3. A mouthwash composition for retarding dental plaque formation comprising (1) para-aminobenzoic acid in an amount sufficient to inhibit capsule formation by oral microorganisms without inhibiting the growth of said microorganisms; (2) a sudsing agent; (3) ethyl alcohol; and (4) water.

4. A chewing gum composition for retarding dental plaque formation comprising (1) para-aminobenzoic acid in an amount sufficient to inhibit capsule formation by oral microorganisms without inhibiting the growth of said microorganisms; and (2) a gum base.

5. A prophylaxis paste composition for retarding dental plaque formation comprising (1) para-aminobenzoic acid in an amount sufficient to inhibit capsule formation by oral microorganisms without inhibiting the growth of said microorganisms; and (2) pumice.

References Cited

Merck Index, 7th ed., published by Merck & Co., Inc., Rahway, N.J., 1960, p. 52.

RICHARD L. HUFF, *Primary Examiner.*